Patented June 19, 1951

2,557,642

UNITED STATES PATENT OFFICE 2,557,642

SYNTHETIC RUBBER COMPOUND

Richard H. Dudley, Cranford, N. J., assignor to Standard Oil Development Company, a corporation of Delaware No Drawing. Application August 3, 1946,
Serial No. 688,347

7 Claims. (Cl. 260—5)

This invention relates to an improvement in the compounding of synthetic rubber materials of the type of "butyl" rubber as made according to U. S. Patent 2,356,128, and similar products.

It is well known that butyl rubber in general exhibits properties which are similar to those of natural rubber and that it can be used for many purposes as a satisfactory substitute for the same; but for certain special uses, especially where the material is subjected to high temperatures, butyl rubber too rapidly loses its hardness and elasticity. For example, butyl rubber would have considerably improved commercial use in the manufacture of "curing bags," which are used in the shaping and curing of automobile tire casings, if the material could be made more resistant to heat.

It has been found, in accordance with the present invention, that butyl rubber can be made more resistant to the softening effect of heat if there is incorporated in the same, prior to the curing operation, from about 1% to about 4% of its weight of a vulcanizable highly unsaturated hydrocarbon polymer, such as natural rubber, or a synthetic rubber of the Buna S or Buna N type. Butyl rubber so compounded has been found to exhibit properties which indicate it to be suitable for the manufacture of curing bags, molding blankets, and the like. At the same time, it has been found that if a butyl rubber stock suitable for the manufacture of inner tubes for automobile tires is compounded with a vulcanizable polymer of the type described, the curing time required to produce a modulus of the desired range can be considerably shortened. This advantage is also realized in the manufacture of other molded and proofed goods. Quantities of natural rubber and the like which are as great as 50% based on the butyl rubber have been tried, but the results are in general not satisfactory when the quantity is greater than about 4%.

The highly unsaturated vulcanizable polymer which is employed as an ingredient in the compounding of butyl rubber and the like in accordance with the present invention may be more accurately defined as a vulcanizable high molecular weight aliphatic hydrocarbon polymer having an unsaturation value greater than 25% as measured by the Kemp method for natural rubber. After the incorporation of such a material in the butyl rubber, the latter may be compounded and processed in the usual manner.

The primary raw material for the production of the synthetic rubber product of the present invention is the product of the interpolymerization of a polymerizable olefin of not more than 8 carbon atoms and a diolefin of 4 to 14 carbon atoms per molecule. More particularly, the invention applies to the low temperature interpolymer of isobutylene and a diolefin, known as "butyl" rubber.

The low temperature interpolymer is customarily prepared by a low temperature catalysis. The raw material for this polymer preferably consists of a major proportion of isobutylene with a minor proportion of a polyolefin such as butadiene, isoprene, piperylene, dimethyl butadiene, dimethallyl, myrcene, or the like, substantially any of the polyolefins having from 4 to 12 or 14 carbon atoms per molecule being usable. The preferred proportions range from 70 parts of isobutylene with 30 parts of the diolefin to 99.5 parts of isobutylene with 0.5 part of the polyolefin. The mixture is cooled to a temperature within the range between approximately −20 and −165° C., the preferred range being between −50 and −100° C. The cooling may be obtained by a refrigerating jacket on the storage container or polymerization reactor, or by the admixture into the olefinic material of a refrigerant. For internal refrigerant of this type, such substances as liquid ethylene, liquid propene, solid or liquid carbon dioxide, liquid propane, and the like are particularly useful. Other substances, such as liquid methane under pressure, are also usable.

The cold mixture is polymerized by the application thereto of a Friedel-Crafts catalyst of a type depending upon the particular olefin to be polymerized. The preferred catalyst is a solution of a Friedel-Crafts catalyst such as aluminum chloride in solution in a low-freezing, non-complex-forming solvent such as ethyl or methyl chloride or carbon disulfide, or the like.

The Friedel-Crafts catalyst may be substantially any of the substances disclosed by N. O.

Calloway in his article on the "Friedel-Crafts Synthesis" printed in the issue of "Chemical Reviews" published for the American Chemical Society at Baltimore in 1935, in volume XVII, No. 3, the article beginning on page 327, the list being particularly well shown on page 375. The catalyst may be a simple salt or may be one or another of a wide range of double salts depending upon the solvent it is desired to use, and the rate of speed at which the polymerization is to occur.

The catalyst solvent depends to a considerable extent upon the choice of metal halide to be used. If the metal halide is to be aluminum chloride, the preferred solvent is ethyl or methyl, mono- or polyhalide, usually the chloride, or carbon disulfide, or the like, the only limitation being that the material have a freezing point below 0° C. in order to allow the catalyst salt and catalyst solvent to dissolve in the mixed polymerizate. If the catalyst salt is to be aluminum bromide or a mixed salt, a hydrocarbon solvent is useful, including such substances as pentane, butane, propane, or ethane; liquid methane being usable, but less suitable because of its low boiling point, and hexane, heptane and octane being usable but less suitable because of their higher boiling points and the difficulty of removing them from the finished polymer. With a limited number of the higher polyolefins, gaseous boron trifluoride also may be used, particularly with dimethyl butadiene as the polyolefin. Preferably, however, the boron trifluoride is used in solution, either in liquid ethane, liquid propane, or liquid butane.

The polymerization step is conveniently carried out either in successive batches or in a continuous process. In either event, the catalyst is desirably added to the polymerizate under conditions of high turbulence such as by application of the catalyst in the form of a fine spray onto the surface of the rapidly stirred olefinic mixture, or by delivery in the form of a fine jet under high pressure into a turbulence zone in the neighborhood of a high speed stirrer or in other analogous ways which will be obvious to those skilled in the art.

The polymerization proceeds rapidly to yield a high-grade solid polymer which is separated from residual quantities of unpolymerized olefins and diluent-refrigerant (if used) and brought up to room temperature.

This procedure as above described is shown in greater detail in the Sparks and Thomas U. S. Patent 2,356,128, issued August 22, 1944, to which Australian Patent No. 112,875 corresponds.

In all of these polymers, an essential component is a polyolefin having from 4 to 12 or 14 carbon atoms per molecule, which may be conjugated or non-conjugated, and may have two or more double linkages.

In practicing the invention, the rubber polymer, prepared as above outlined, is mixed on the mill with the desired quantity, from about 1% to about 4%, of its weight of natural rubber or other unsaturated polymer. If the latter does not already possess a plasticity similar to that of the butyl rubber, it should be broken down or masticated until the plasticity resembles that of the butyl rubber. This will be required particularly in the case of natural rubber, e. g., in the form of smoked sheets. Other compounding agents regularly employed in the compounding of butyl rubber, or added for specific purposes, may then be added in the usual manner. Such compounding agents would include vulcanizing agents, e. g., sulfur or p-quinone dioxime or its esters, accelerating agents, e. g., the well-known ultra-accelerators of commerce, also zinc oxide, stearic acid, carbon black, clay, and a wide range of other pigments and addition agents.

The resulting compound is formed into the desired shape by any of the usual methods for the processing of rubber or rubbery substances including extruding into tubes or threads on a round wire, or calendering, or applying to fabric by a dipping procedure from a solution containing the compounded rubbery substance. The compounded synthetic rubber may then be cured at temperatures ranging from about 240° to about 380° F., at a time interval ranging from about 4 to about 120 minutes. The curing operation yields a cured rubber-like article having good tensile strength, a good elongation, a good abrasion resistance and a particularly good resistance to the action of heat.

In the examples which follow are given data on the properties of synthetic rubber products obtained by compounding the same in accordance with the present invention, but it is to be understood that these examples are given for the purpose of illustration only and do not limit the scope of the invention in any way.

EXAMPLE 1

In this example a series of butyl rubber stocks were prepared which are particularly suitable for the manufacture of curing bags. In these tests the effects of compounding with natural rubber and with Buna S synthetic rubber are studied, several variations being made in the particular curing agents and accelerators used, and in other ingredients of the compounded stock. The stocks were cured for 60 minutes at 320° F. and then aged for 1, 2 and 3 cycles, each cycle consisting of 8 hours in steam at 338° F. and 8 hours in air at 80 lbs. pressure and 260° F. These aging tests were conducted to determine the deteriorating effect of heat, oxidation, and steam, thus simulating the conditions encountered when the material is used in the form of a curing bag.

The base stock in all of these tests was a butyl rubber stock prepared in the following manner: A polymer was prepared by polymerizing a mixture consisting of 97.5 parts of isobutylene of 99% purity with 2.5 parts of isoprene of 96% purity at a temperature of approximately −100° C. by the application thereto of aluminum chloride in solution in methyl chloride. The resulting polymer was separated from the cold reaction liquid, brought up to room temperature, washed with water in a slurry tank, and dried to remove substantially all of the low boiling hydrocarbons and substantially all traces of residual catalyst and water.

The material designated as "Buna S" in the tables of data was an emulsion copolymer of 75% butadiene and 25% styrene. The vulcanization accelerators designated as "Tuads" and "Monex" are tetramethyl thiuram disulfide and tetramethyl thiuram monosulfide, respectively.

Table I shows data on the effect of natural rubber and Buna S in a Tuads-Monex cured stock, in which sulfur is employed as the curing agent. In Table II data are given showing results of similar tests with a stock cured by a mixture of sulfur and p-quinone dioxime dibenzoate. In Table III are shown data from tests of a stock cured by sulfur and p-quinone dioxime in the presence of a retarder. In Table IV are shown tests with a stock similar to that set forth in Table III but containing in addition hydrated alumina as a filler.

The cured samples were submitted to tests of tensile strength, percent ultimate elongation, modulus at 300% elongation and Shore hardness, and the values obtained are shown in the tables under each recipe in the order given. In these tables the amounts of the various ingredients are shown as "parts per 100 parts of butyl rubber by weight."

Table I

| | | | |
|---|---|---|---|
| Butyl rubber | 100.0 | 100.0 | 100.0 |
| Buna S | ----- | 2.0 | ----- |
| Smoked sheets | ----- | ----- | 2.0 |
| Zinc oxide | 25.0 | 25.0 | 25.0 |
| Sulfur | 2.0 | 2.0 | 2.0 |
| Tuads | 1.0 | 1.0 | 1.0 |
| Monex | 1.0 | 1.0 | 1.0 |
| Easy processing channel black | 30.0 | 30.0 | 30.0 |
| Medium thermal black | 30.0 | 30.0 | 30.0 |
| Softening oil | 5.0 | 5.0 | 5.0 |
| Unaged cures: | | | |
|   Tensile—Elongation | 1,663—543 | 1,525—543 | 1,238—526 |
|   Modulus at 300%—Shore (60 min. at 320° F.) | 837— 45 | 736— 60 | 533— 59 |
| Steam aged cures—1 cycle: | | | |
|   Tensile—Elongation | 840—560 | 720—610 | 610—545 |
|   Modulus at 300%—Shore (60 min. at 320° F.) | 360— 42 | 325— 59 | 305— 53 |
| Steam aged cures—2 cycles: | | | |
|   Tensile—Elongation | 215—645 | 300—675 | 245—555 |
|   Modulus at 300%—Shore (60 min. at 320° F.) | 55— 34 | 110— 54 | 115— 47 |
| Steam Aged Cures—3 cycles: | | | |
|   Tensile—Elongation | 55—640 | 55—575 | 60—495 |
|   Modulus at 300%—Shore (60 min. at 320° F.) | —24 | 55— 59 | 60— 39 |

Table II

| | | | | | |
|---|---|---|---|---|---|
| Butyl Rubber | 100.0 | 100.0 | 100.0 | 100.0 | 100.0 |
| Buna S | ----- | 2.0 | 4.0 | ----- | ----- |
| Smoked Sheets | ----- | ----- | ----- | 2.0 | 4.0 |
| Zinc Oxide | 25.0 | 25.0 | 25.0 | 25.0 | 25.0 |
| Sulfur | 2.0 | 2.0 | 2.0 | 2.0 | 2.0 |
| p-Quinone Dioxime Dibenzoate | 6.0 | 6.0 | 6.0 | 6.0 | 6.0 |
| Pb₃O₄ | 10.0 | 10.0 | 10.0 | 10.0 | 10.0 |
| Easy Processing Channel Black | 30.0 | 30.0 | 30.0 | 30.0 | 30.0 |
| Medium Thermal Black | 30.0 | 30.0 | 30.0 | 30.0 | 30.0 |
| Softening Oil | 5.0 | 5.0 | 5.0 | 5.0 | 5.0 |
| Unaged Cures: | | | | | |
|   Tensile—Elongation | 1,520—293 | 1,521—363 | 1,493—384 | 1,361—430 | 1,191—503 |
|   Modulus at 300%—Shore (60 min. at 320° F.) | 1,446— 57 | 1,255— 65 | 1,136— 65 | 858— 62 | 593— 64 |
| Steam Aged Cures—1 cycle: | | | | | |
|   Tensile—Elongation | 910—255 | 1,050—355 | 1,095—350 | 960—435 | 890—485 |
|   Modulus at 300%—Shore (60 min. at 320° F.) | — 57 | 910— 52 | 935— 68 | 665— 66 | 525— 64 |
| Steam Aged Cures—2 cycles: | | | | | |
|   Tensile—Elongation | 655—345 | 730—405 | 825—305 | 655—465 | 595—520 |
|   Modulus at 300%—Shore (60 min. at 320° F.) | 600— 50 | 560— 56 | 725— 71 | 430— 63 | 360— 62 |
| Steam Aged Cures—3 cycles: | | | | | |
|   Tensile—Elongation | 475—300 | 565—333 | 615—305 | 405—390 | 365—395 |
|   Modulus at 300%—Shore (60 min. at 320° F.) | 475— 45 | 510— 56 | 590— 69 | 280— 53 | 310— 65 |

Table III

| | | | |
|---|---|---|---|
| Butyl rubber | 100.0 | 100.0 | 100.0 |
| Buna S | ----- | 2.0 | ----- |
| Smoked sheets | ----- | ----- | 2.0 |
| Zinc oxide | 25.0 | 25.0 | 25.0 |
| Sulfur | 2.0 | 2.0 | 2.0 |
| p-Quinone dioxime | 2.0 | 2.0 | 2.0 |
| Pb₃O₄ | 10.0 | 10.0 | 10.0 |
| Octadecylamine | 1.0 | 1.0 | 1.0 |
| Easy processing channel black | 15.0 | 15.0 | 15.0 |
| Medium thermal black | 45.0 | 45.0 | 45.0 |
| Softening oil | 5.0 | 5.0 | 5.0 |
| Unaged cures: | | | |
|   Tensile—Elongation | 1,375—525 | 1,605—505 | 1,225—595 |
|   Modulus at 300%—Shore (60 min. at 320° F.) | 790— 44 | 695— 44 | 420— 47 |
| Steam aged cures—1 cycle: | | | |
|   Tensile—Elongation | 1,125—355 | 1,160—410 | 770—430 |
|   Modulus at 300%—Shore (60 min. at 320° F.) | 855— 43 | 735— 49 | 495— 45 |
| Steam aged cures—2 cycles: | | | |
|   Tensile—Elongation | 840—385 | 1,010—425 | 654—435 |
|   Modulus at 300%—Shore (60 min. at 320° F.) | 600— 41 | 630— 48 | 410— 50 |
| Steam aged cures—3 cycles: | | | |
|   Tensile—Elongation | 665—385 | 705—355 | 500—485 |
|   Modulus at 300%—Shore (60 min. at 320° F.) | 480— 37 | 385— 44 | 270— 43 |

Table IV

| | | | |
|---|---|---|---|
| Butyl rubber | 100.0 | 100.0 | 100.0 |
| Buna S | ----- | 2.0 | ----- |
| Smoked sheets | ----- | ----- | 2.0 |
| Zinc oxide | 25.0 | 25.0 | 25.0 |
| Sulfur | 2.0 | 2.0 | 2.0 |
| p-Quinone dioxime | 2.0 | 2.0 | 2.0 |
| Pb₃O₄ | 10.0 | 10.0 | 10.0 |
| Octadecylamine | 1.0 | 1.0 | 1.0 |
| Softening oil | 5.0 | 5.0 | 5.0 |
| Hydrated alumina | 80.0 | 80.0 | 80.0 |
| Unaged cures: | | | |
|   Tensile—Elongation | 1,430—375 | 1,240—865 | 930—940 |
|   Modulus at 300%—Shore (60 min. at 320° F.) | 235— 34 | 140— 41 | 110— 37 |
| Steam aged cures—1 cycle: | | | |
|   Tensile—Elongation | 605—655 | 435—625 | 470—575 |
|   Modulus at 300%—Shore (60 min. at 320° F.) | 210— 56 | 185— 60 | 250— 60 |
| Steam aged cures—2 cycles: | | | |
|   Tensile—Elongation | 335—720 | 275—700 | 325—560 |
|   Modulus at 300%—Shore (60 min. at 320° F.) | 105— 55 | 110— 60 | 159— 58 |
| Steam aged cures—3 cycles: | | | |
|   Tensile—Elongation | 155—425 | 160—420 | 230—335 |
|   Modulus at 300%—Shore (60 min. at 320° F.) | 105— 51 | 160— 66 | 180— 63 |

At present the chief disadvantage of butyl stocks in heat resistance service is their softening after prolonged exposure to high temperatures. From the above data the advantage of incorporating small quantities of highly unsaturated polymers in reducing heat softening can be readily seen. It can be noted that after aging, the straight butyl compound lost an appreciable amount of its modulus at 300% and its hardness as measured with a Shore durometer. This loss of modulus and Shore hardness was considerably reduced by incorporating 1 to 4 parts of natural rubber or Buna S.

EXAMPLE 2

In this example the effect of compounding smoked sheets and Buna S in a butyl rubber stock suitable for the manufacture of inner tubes was tested, data being obtained on the curing of the stock at 15, 30, 60 and 120 minutes, respectively, at 307° F. Data were obtained on the tensile strength, modulus at 300% elongation, and elongation at break of the cured samples, and are shown in Table V. The butyl rubber stock and the Buna S material were prepared as described in Example 1. The accelerator designated as "Captax" is mercaptobenzothiazole.

It will be observed that the addition of the natural rubber or Buna S accelerated the rate of cure and increased the modulus of the vulcanizate in the product obtained by the short time cure.

Table V

| | | | | | |
|---|---|---|---|---|---|
| Butyl rubber | 100.0 | 100.0 | 100.0 | 100.0 | 100.0 |
| Buna S | | 1.0 | 2.0 | | |
| Smoked sheets | | | | 1.0 | 2.0 |
| Zinc oxide | 5.0 | 5.0 | 5.0 | 5.0 | 5.0 |
| Stearic acid | 1.0 | 1.0 | 1.0 | 1.0 | 1.0 |
| Sulfur | 2.0 | 2.0 | 2.0 | 2.0 | 2.0 |
| Tuads | 1.0 | 1.0 | 1.0 | 1.0 | 1.0 |
| Captax | 0.5 | 0.5 | 0.5 | 0.5 | 0.5 |
| Semi-reinforcing furnace black | 30.0 | 30.0 | 30.0 | 30.0 | 30.0 |
| Easy processing channel black | 20.0 | 20.0 | 20.0 | 20.0 | 20.0 |
| Tensile—Mod. at 300%—Elongation at Break: | | | | | |
| Cure—15 min. at 307° F | 2,460— 570—700 | 2,180— 690—630 | 1,970— 670—650 | 2,230— 660—670 | 2,020— 840—610 |
| Cure—30 min. at 307° F | 2,400— 760—620 | 2,240— 830—630 | 1,950— 920—600 | 2,270— 940—590 | 2,120— 960—590 |
| Cure—60 min. at 307° F | 2,100—1,100—520 | 1,920—1,150—500 | 2,290—1,190—500 | 2,170—1,180—510 | 2,060—1,150—500 |
| Cure—120 min. at 307° F | 1,870—1,190—460 | 1,840—1,130—420 | 1,930—1,160—490 | 1,950—1,310—450 | 2,030—1,110—510 |

While there are described above but a limited number of embodiments of the present invention, it is possible to produce still other embodiments without departing from the inventive concept herein disclosed, and it is accordingly desired that the invention be considered as limited solely by the terms of the appended claims.

I claim:

1. The method of producing a stable rubber-like vulcanized product which comprises incorporating 1 to 2 parts of natural rubber smoked sheets with 100 parts of a solid rubbery interpolymer of isobutylene and isoprene prepared from 97.5% of the former and 2.5% of the latter and curing the mixture so produced in the presence of 2 parts of sulfur, 1 part of tetramethyl thiuram disulfide, and 0.5 part mercaptobenzothiazole for a period of 15 to 30 minutes at a temperature of about 307° F.

2. The method of producing a stable rubber-like product having superior heat resistance which comprises incorporating 2 parts by weight of a vulcanizable high molecular weight rubbery hydrocarbon polymer having an unsaturation value greater than 25% as measured by the Kemp method for natural rubber and selected from the group consisting of natural rubber and a butadiene-styrene synthetic rubber copolymer with 100 parts by weight of a solid rubbery interpolymer of isobutylene and isoprene prepared from about 97.5% of the former and about 2.5% of the latter, and curing the mixture so produced in the presence of sulfur and a vulcanization accelerator.

3. The method of producing a stable rubber-like product having superior heat resistance which comprises incorporating 2 parts by weight of natural rubber smoked sheets with 100 parts by weight of a solid rubbery interpolymer of isobutylene and isoprene prepared from about 97.5 parts by weight of the former and about 2.5 parts by weight of the latter, and curing the mixture so produced in the presence of sulfur and a vulcanization accelerator.

4. The method of producing a stable rubber-like product having superior heat resistance which comprises incorporating 2 parts by weight of a butadiene-styrene synthetic rubber copolymer with 100 parts by weight of a solid rubbery interpolymer of isobutylene and isoprene prepared from about 97.5 parts by weight of the former and about 2.5 parts by weight of the latter, and curing the mixture so produced in the presence of sulfur and a vulcanization accelerator.

5. A stable rubber-like product having superior heat resistance and obtained by incorporating 2 parts by weight of a vulcanizable high molecular weight rubbery hydrocarbon polymer having an unsaturation value greater than 25% as measured by the Kemp method for natural rubber and selected from the group consisting of natural rubber and a butadiene-styrene synthetic rubber copolymer with 100 parts by weight of a solid rubbery interpolymer of isobutylene and isoprene prepared from about 97.5% of the former and about 2.5% of the latter, and curing the resulting mixture in the presence of sulfur and a vulcanization accelerator.

6. A stable rubber-like product having superior heat resistance and obtained by incorporating 2 parts by weight of natural rubber smoked sheets with 100 parts by weight of a solid rubbery interpolymer of isobutylene and isoprene prepared and about 97.5 parts by weight of the former and about 2.5 parts by weight of the latter, and curing the mixture so produced in the presence of sulfur and a vulcanization accelerator.

7. A stable rubber-like product having superior heat resistance and obtained by incorporating 2 parts by weight of a butadiene-styrene synthetic rubber copolymer with 100 parts by weight of a solid rubbery interpolymer of isobutylene and isoprene prepared from about 97.5 parts by weight of the former and about 2.5 parts by weight of the latter, and curing the mixture so produced in the presence of sulfur and a vulcanization accelerator.

RICHARD H. DUDLEY.

REFERENCES CITED

The following references are of record in the file of this patent:

UNITED STATES PATENTS

| Number | Name | Date |
|---|---|---|
| 2,305,412 | Frolich | Dec. 15, 1942 |
| 2,332,194 | Beekley | Oct. 19, 1943 |
| 2,381,267 | Drake | Aug. 7, 1945 |
| 2,383,839 | Beekley | Aug. 28, 1945 |
| 2,391,095 | Kellog | Dec. 18, 1945 |
| 2,467,322 | Lightbown et al. | Apr. 12, 1949 |
| 2,471,905 | Smith | May 31, 1949 |

FOREIGN PATENTS

| Number | Country | Date |
|---|---|---|
| 513,521 | Great Britain | Oct. 16, 1939 |

OTHER REFERENCES

Lightbown, "Rubber Age," August 1942, pp. 377 and 380.